US012701614B2

(12) United States Patent
Han et al.

(10) Patent No.: US 12,701,614 B2
(45) Date of Patent: Aug. 4, 2026

(54) APPARATUS FOR CHANNEL ACCESS IN WLAN SYSTEM AND OPERATING METHOD OF THE APPARATUS

(71) Applicants: Samsung Electronics Co., Ltd., Suwon-si (KR); Seoul National University R&DB Foundation, Seoul (KR)

(72) Inventors: Jonghun Han, Suwon-si (KR); Saewoong Bahk, Suwon-si (KR); Jongyeon Park, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 403 days.

(21) Appl. No.: 18/379,943

(22) Filed: Oct. 13, 2023

(65) Prior Publication Data

US 2024/0137981 A1     Apr. 25, 2024

(30) Foreign Application Priority Data

Oct. 17, 2022     (KR) ........................ 10-2022-0133607

(51) Int. Cl.
H04W 74/08 (2024.01)
H04W 16/04 (2009.01)
(Continued)

(52) U.S. Cl.
CPC ....... H04W 74/0816 (2013.01); H04W 16/04 (2013.01); H04W 16/10 (2013.01); H04W 72/56 (2023.01)

(58) Field of Classification Search
CPC . H04W 16/10; H04W 74/0808; H04W 74/04; H04W 74/0816
See application file for complete search history.

(56) References Cited

U.S. PATENT DOCUMENTS 10,945,279 B2     3/2021   Kim et al.
2011/0103374 A1   5/2011   Lajoie et al.
(Continued)

FOREIGN PATENT DOCUMENTS

KR     10-2022-0089458 A     6/2022
WO         2021/107685 A1     6/2021
WO         2021/162373 A1     8/2021

OTHER PUBLICATIONS

Sharan Naribole et al., "Multi-Channel Mobile Access Point in Next-Generation IEEE 802.11be WLANs", ICC 2021—IEEE International Conference on Communications, Jun. 2021, 7 pages, DOI: 10.1109/ICC42927.2021.9500889.

*Primary Examiner* — Shukri Taha
(74) *Attorney, Agent, or Firm* — Sughrue Mion, PLLC

(57) ABSTRACT

An operating method of an access point (AP) multi-link device (MLD) is provided. The operating method includes: based on at least one non-AP MLD and at least one single link device (SLD) attempting channel access through a first link of the AP MLD, identifying a contention window of the at least one non-AP MLD, based on a ratio of, with respect to the first link, an idle time of the at least one non-AP MLD to an idle time of the at least one SLD; and transmitting a beacon frame including information about the contention window to the at least one non-AP MLD.

16 Claims, 12 Drawing Sheets

300

(51) Int. Cl.
    *H04W 16/10*     (2009.01)
    *H04W 72/56*     (2023.01)
    *H04W 74/0816*    (2024.01)

(56)              References Cited

U.S. PATENT DOCUMENTS

| | | | |
|---|---|---|---|
| 2013/0329620 A1 | 12/2013 | Kim et al. | |
| 2018/0115981 A1* | 4/2018 | Kim | H04W 72/1215 |
| 2022/0007417 A1 | 1/2022 | Xin et al. | |
| 2022/0418018 A1 | 12/2022 | Jang et al. | |
| 2023/0128479 A1* | 4/2023 | Jang | H04W 76/11 |
| | | | 370/329 |
| 2025/0119948 A1* | 4/2025 | Shafin | H04W 74/0816 |

* cited by examiner

FIG. 6B

| Element ID | Length | QoS Info | Update EDCA Info | AC_BE Parameter Record | AC_BK Parameter Record | AC_VI Parameter Record | AC_VO Parameter Record |
|---|---|---|---|---|---|---|---|
| 1 | 1 | 1 | 1 | 4 | 4 | 4 | 4 |

Octets:

FIG. 7B

| Element ID | Length | Station Count | Channel Utilization | Available Admission Capacity |
|---|---|---|---|---|

Octets:     1     1     2     1

APPARATUS FOR CHANNEL ACCESS IN WLAN SYSTEM AND OPERATING METHOD OF THE APPARATUS

CROSS-REFERENCE TO RELATED APPLICATION

This application is based on and claims priority to Korean Patent Application No. 10-2022-0133607, filed on Oct. 17, 2022, in the Korean Intellectual Property Office, the disclosure of which is incorporated by reference herein in its entirety.

BACKGROUND

The present disclosure relates to an apparatus for channel access in a wireless local area network (WLAN) system and an operating method of the apparatus.

Wireless local area network (WLAN) connects two or more devices with one another by using a wireless signal transfer scheme, and the most of current WLAN technologies are based on the Institute of Electrical and Electronics Engineers (IEEE) 802.11 standard. The 802.11 standard has advanced to 802.11b, 802.11a, 802.11g, 802.11n, 802.11ac, and 802.11ax.

Furthermore, in 802.11be (referred to as extremely high throughput (EHT)) which is a next-generation WLAN standard, it is required to implement support of a 6 GHz unlicensed frequency band, the use of a bandwidth of a maximum of 320 MHz per channel, the introduction of hybrid automatic repeat and request (HARQ), and the support of a maximum of 16×16 multi-input multi-output (MIMO). Therefore, a next-generation WLAN system is expected to effectively support low latency and super-high-speed transmission like new radio (NR), which is 5G technology.

SUMMARY

One or more embodiments provide an apparatus for channel access in a wireless local area network (WLAN) system and an operating method of the apparatus.

According to an aspect of an embodiment, an operating method of an access point (AP) multi-link device (MLD), includes: based on at least one non-AP MLD and at least one single link device (SLD) attempting channel access through a first link of the AP MLD, identifying a contention window of the at least one non-AP MLD, based on a ratio of, with respect to the first link, an idle time of the at least one non-AP MLD to an idle time of the at least one SLD; and transmitting a beacon frame including information about the contention window to the at least one non-AP MLD.

According to another aspect of an embodiment, an operating method of a non-access point (non-AP) multi-link device (MLD) performing communication through a non-simultaneous transmit and receive (NSTR) link, includes: receiving a beacon frame indicating channel utilization information about the NSTR link from an access point (AP) MLD; estimating an idle time of the non-AP MLD and an idle time of at least one single link device (SLD), based on the channel utilization information; identifying a contention window of the non-AP MLD, based on a ratio of the idle time of the non-AP MLD to the idle time of the at least one SLD; and attempting channel access on the NSTR link, based on the contention window.

According to another aspect of an embodiment, an access point (AP) multi-link device (MLD) includes: a transceiver;

and a processor configured to: based on at least one non-AP MLD and at least one single link device (SLD) attempting channel access through a first link of the AP MLD, identify a contention window of the at least one non-AP MLD, based on a ratio of, with respect to the first link, an idle time of the at least one non-AP MLD to an idle time of the at least one SLD; and control the transceiver to transmit a beacon frame including information about the contention window to the at least one non-AP MLD.

BRIEF DESCRIPTION OF DRAWINGS

The above and other aspects and features of the present disclosure will be more clearly understood from the following description of embodiments, taken in conjunction with the accompanying drawings, in which:

FIG. 5 illustrates a contention window determination process according to an

FIG. 6B illustrates an example of an enhanced distribution channel access (EDCA) parameter set element format;

FIG. 7B illustrates an example of a basic service set (BSS) load element, according to an embodiment;

DETAILED DESCRIPTION

Figure 1:
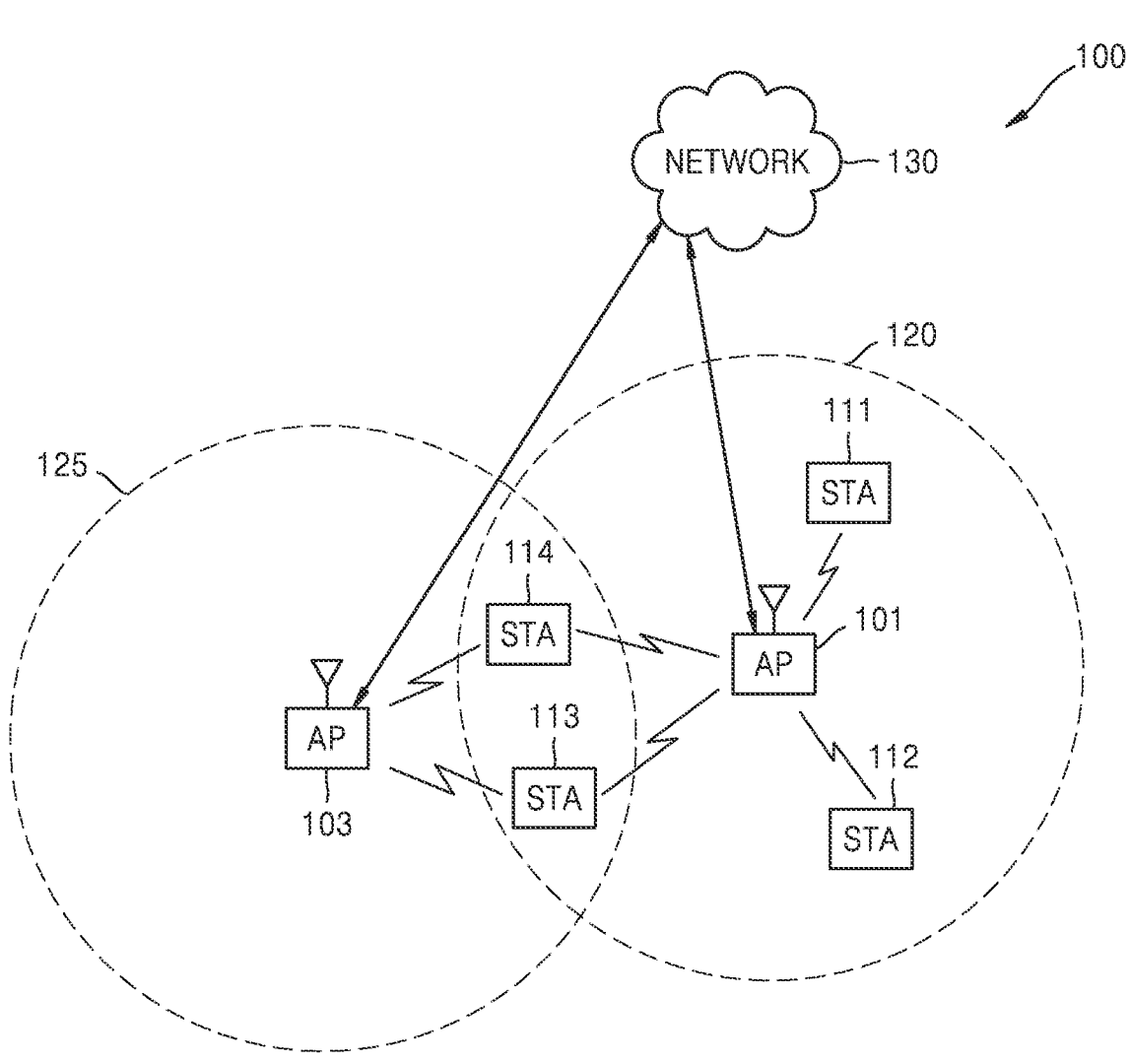
FIG. 1 is a diagram describing an example of a wireless local area network (WLAN) system according to an embodiment.

Hereinafter, embodiments will be described in detail with reference to the accompanying drawings.

Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure. Herein, like reference numerals refer to like elements.

The terms used herein are used for explaining embodiments and are not intended to limit the scope of the present disclosure. Herein, terms of a singular form may include plural forms unless specifically described. It will be understood that the terms "includes," "including," "comprises," and/or "comprising," when used herein, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Also, in describing embodiments in detail, a wireless communication system based on orthogonal frequency-division multiplexing (OFDM) or orthogonal frequency-division multiplexing access (OFDMA) (particularly, the IEEE 802.11 standard) will be mainly described, but embodiments may be applied to other communication systems (for example, a cellular communication system, such as long term evolution (LTE), LTE-advanced (LTE-A), new radio (NR), wireless broadband (WiBro), or global system for mobile communication (GSM), or a close-distance communication system such as Bluetooth or near field communication (NFC)) in a range which does not largely depart from the scope of the present disclosure, based on slight modifications which may be achieved as determined by those of ordinary skill in the art.

Also, before providing the following detailed descriptions, certain words and phrases used herein may be defined. The term "connect (couple)" and derivatives thereof may represent whether two or more elements are in a physical contact state or not, or may denote direct or indirect communication therebetween. The terms "transmit", "receive", and "communicate" and derivatives thereof may include all of direct communication and indirect communication. The terms "comprise" and "include" and derivatives thereof may denote non-limiting inclusion. The term "or" may denote a comprehensive term denoting "and/or". The term "associated with" and derivatives thereof may denote "included in ~", "connect ~ with each other", "involve", "involve", "involved in ~", "connect to/with ~", "couple to/with ~", "may communicate with ~", "cooperate with ~", "interpose", "place in parallel", "approximate to ~", "restricted to ~", "have", "have characteristic of ~", and "have relationship with ~". The term "controller" may denote an arbitrary device or system or a portion thereof, which controls at least one operation. Such a controller may be implemented with hardware or a combination of hardware and software and/or firmware. A function associated with a certain controller may be centralized or distributed locally or remotely. In a case where the term "at least one ~" is used together with a list of items, this may denote that one or more different combinations of listed items may be used and only one item of the list may be needed. For example, at least one of A, B, and C may include only A, only B, only C, a combination of and A and B, a combination of A and C, a combination of B and C, or a combination of A, B, and C.

Also, various functions described herein may be implemented or supported by artificial intelligence (AI) technology or one or more computer programs, and each of the computer programs may be configured with computer-readable program code and may be executed in a computer-readable medium. The terms "application" and "program" may denote one or more computer programs, a software component, an instruction set, a procedure, an entity, a class, an instance, relevant data, or a portion thereof suitable for implementation of appropriate computer-readable program code. The term "computer-readable program code" may include all types of computer code including source code, entity code, and execution code. The term "computer-readable medium" may include all types of mediums accessible by a computer, like read only memory (ROM), random access memory (RAM), hard disk drives, compact disks (CDs), digital video disks (DVDs), or another type of memory. A "non-transitory" computer-readable medium may exclude wired, wireless, optical, or other communication links for transmitting transitory electrical or other signals. The non-transitory computer-readable medium may include a medium which may permanently store data and a medium which may store data or overwrite data later, like a recordable optical disk or an erasable memory device.

In various embodiments described below, a hardware access method will be described for example. However, various embodiments may include technology which uses both hardware and software, and thus, may include a software-based access method. Furthermore, AI technology (i.e., an AI-based access method) may be applied to various embodiments.

Also, terms representing control information, entries, network entities, messages, and elements of a device will be described for convenience of description. Therefore, the present disclosure is not limited to the terms described below, and other terms having the same technical meaning may be used.

FIG. 1 is a diagram describing an example of a wireless local area network (WLAN) system 100. FIG. 1 will be described with reference to FIG. 3, below.

First, as illustrated in FIG. 1, the WLAN system 100 may include access points (APs) 101 and 103.

In detail, the APs 101 and 103 may communicate with at least one network 130 such as the Internet, an Internet protocol (IP) network, or another data network.

Also, the APs 101 and 103 may provide wireless access to the network 130, for a plurality of stations (STAs) 111 to 114 provided in coverage regions 120 and 125 of the APs 101 and 103. Also, the APs 101 and 103 may communicate with each other by using wireless fidelity (WiFi) or other WLAN communication technologies. Also, the APs 101 and 103 may communicate with the plurality of STAs 111 to 114 by using WiFi or other WLAN communication technologies.

For reference, based on a network type, the terms "router" and "gateway" may be used instead of "AP" or "access point". Also, an AP in a WLAN may be provided for a wireless channel. Also, an AP may denote an STA.

Also, based on a network type, an "STA" or a "station" may be used instead other terms "mobile station", "subscriber station", "remote terminal", "user equipment", "wireless terminal", "user device", or "user". For convenience, the term "STA" may be used for representing a remote wireless device which wirelessly accesses an AP or accesses a wireless channel in a WLAN. Herein, an STA may be considered as a mobile device (for example, a mobile phone or a smartphone), but may be a stationary device (for example, a desktop computer, an AP, a media player, a stationary sensor, a television (TV), etc.).

In the drawings, dashed lines indicate an approximate extent of each of the coverage regions 120 and 125. Here, the coverage regions 120 and 125 are illustrated in an approximately circular shape, for description and illustration. However, the coverage regions 120 and 125 associated with the APs 101 and 103 may have a different shape in which various changes associated with a natural or artificial obstruction in a wireless environment is reflected, or may have a different shape including an irregular shape, based on a setting of each of the APs 101 and 103.

The APs 101 and 103 may each include a program and/or a circuit for uplink multi-user (UL MU) or downlink multi-user (DL MU) transmission management in a WLAN system.

Also, FIG. 1 illustrates an example of the WLAN system 100, but embodiments are not limited thereto. That is, various modifications may be made to FIG. 1.

For example, the WLAN system 100 may include an arbitrary number of APs and an arbitrary number of STAs, which are appropriately provided. Also, the AP 101 may directly communicate with an arbitrary number of APs. Also, the AP 101 may provide the STAs 111 to 114 with wireless broadband access to the network 130.

Similarly, each of the APs 101 and 103 may directly communicate with the network 130 and may provide the network 130 with wireless broadband access to the STAs 111 to 114. Also, each of the APs 101 and 103 may implement a connection with various external networks such as an external phone network or a data network.

The STAs 111 to 114 may perform carrier sensing before transmitting data to the AP 101, and may determine whether a channel is busy based on the carrier sensing. When each of the STAs 111 to 114 senses a wireless signal having certain strength or more, each of the STAs 111 to 114 may determine that a corresponding channel is busy and may determine delay access to the corresponding channel based on the corresponding channel being busy. Such a process may be referred to as clear channel assessment (CCA). A level for determining a channel busy state may be referred to as a CCA threshold. For example, when each of the STAs 111 to 114 receives a wireless signal having strength equal to or greater than the CCA threshold, each of the STAs 111 to 114 may process the received wireless signal. On the other hand, when each of the STAs 111 to 114 does not sense a wireless signal in a corresponding channel or senses a wireless signal having strength less than the CCA threshold, each of the STAs 111 to 114 may determine that the corresponding channel is in an idle state. A time for which a corresponding channel is maintained in an idle state may be referred to as an idle time of the corresponding channel.

An AP MLD 310 may include one or more APs, and a non-AP MLD 320 may include one or more STAs. The AP MLD 310 and the non-AP MLD 320 may perform a multi-link operation (MLO), as described below with reference to FIG. 3.

Figure 2:
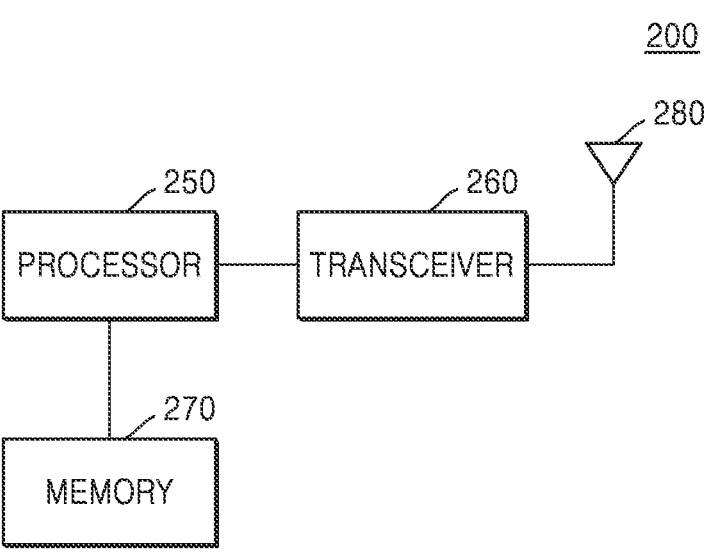
FIG. 2 illustrates a wireless communication device according to an embodiment.

FIG. 2 illustrates a wireless communication device 200 according to an embodiment. FIG. 2 will be described with reference to FIG. 3 described below.

The wireless communication device 200 of FIG. 2 may be included in a transmission device (for example, an AP) or a reception device (for example, an STA). In this regard, the wireless communication device 200 of FIG. 2 may be included in each of the APs 101 and 103 and the STAs 111 to 114 illustrated in FIG. 1, and for example, may be applied to sensors used in computers, smartphones, portable electronic devices, tablet computers, wearable devices, and Internet of things (IoT).

Referring to FIG. 2, the wireless communication device 200 of FIG. 2 may include a processor 250, a transceiver 260, a memory 270, and an antenna 280.

The processor 250 may control all operations of the transceiver 260 and may read data from or write data in the memory 270. The transceiver 260 may transmit and receive a wireless signal and may be controlled by the processor 250.

When the wireless communication device 200 is included in a transmission device (i.e., when the wireless communication device 200 performs a transmission function), the transceiver 260 may generate a physical layer convergence protocol (PLCP) protocol data unit (PPDU) including a preamble and a payload and may transmit the generated PPDU to a reception device.

On the other hand, when the wireless communication device 200 is included in a reception device (i.e., when the wireless communication device 200 performs a reception function), the transceiver 260 may receive a PPDU including a preamble and a payload from the reception device. Also, the transceiver 260 may decode a payload based on the preamble of the received PPDU. In this regard, the transceiver 260 may decode the preamble of the PPDU through decoding thereof and may decode the payload of the PPDU, based on a decoding result.

The memory 270 may store data such as a basic program, an application program, and setting information for an operation of the wireless communication device 200. Therefore, the memory 270 may store instructions and/or data associated with the processor 250 and the transceiver 260.

The antenna 280 may be connected to the transceiver 260 and may transmit a signal, provided from the transceiver 260, to another wireless communication device (a terminal or a base station) or may provide the transceiver 260 with a signal received from the other wireless communication device.

For example, the wireless communication device 200 performing communication through an NSTR link may be an AP MLD 310 described below. The AP MLD 310 may include a processor 250, which determines a contention window of a non-AP MLD, based on a ratio of an idle time of the non-AP MLD correlated with the NSTR link to an idle time of at least one single-link device (SLD) correlated with the NSTR link, and a transceiver 260. The processor 250 may control the transceiver 260 to transmit a beacon frame, including information about the determined contention window of the non-AP MLD, to the non-AP MLD. The information about the determined contention window of the non-AP MLD may be included in an enhanced distribution channel access (EDCA) parameter set of the beacon frame.

The processor 250 may measure the channel utilization of the NSTR link, measure of a channel use time of the non-AP MLD 320, and estimate an idle time of the non-AP MLD 320, based on the channel utilization of the NSTR link and the channel use time of the non-AP MLD 320. The processor 250 may estimate an idle time of the AP MLD 310, based on the channel utilization of the NSTR link. The idle time of the AP MLD 310 may be the same as an idle time of the at least one SLD, and thus, the processor 250 may estimate the idle time of the at least one SLD, based on the idle time of the AP MLD 310. The idle time of the non-AP MLD 320 may be less than the idle time of the at least one SLD. The processor 250 may again determine a contention window of the non-AP MLD 320, based on a period of one of a multiple of a transmission period of the beacon frame. The processor 250 may control the transceiver 260 to transmit the beacon frame to the at least one SLD.

The EDCA parameter set may include a quality of service (QoS) Info field and an Update EDCA Info field. The QoS Info field may include information about the contention window of the at least one SLD and an EDCA Parameter Set Update Counter subfield. The EDCA Parameter Set Update Counter subfield may be 0, and whether to update an EDCA parameter of the non-AP MLD may be determined based on the Update EDCA Info field. The Update EDCA Info field may include the determined information about the contention window of the non-AP MLD 320.

For example, the wireless communication device 200 performing communication through the NSTR link may be the non-AP MLD 320 described below. The processor 250 may control the transceiver 260 to receive the beacon frame, including channel utilization information about the NSTR link, from the AP MLD 310. The processor 250 may estimate an idle time of the non-AP MLD 320 and an idle time of the at least one SLD, based on the received channel utilization information. The processor 250 may determine a contention window of the non-AP MLD 320, based on a ratio of the idle time of the non-AP MLD 320 to the idle time of the at least one SLD. The processor 250 may attempt to perform channel access on the NSTR link, based on the determined contention window of the non-AP MLD 320. The channel utilization information may be included in a basic service set (BSS) load element.

Figure 3:
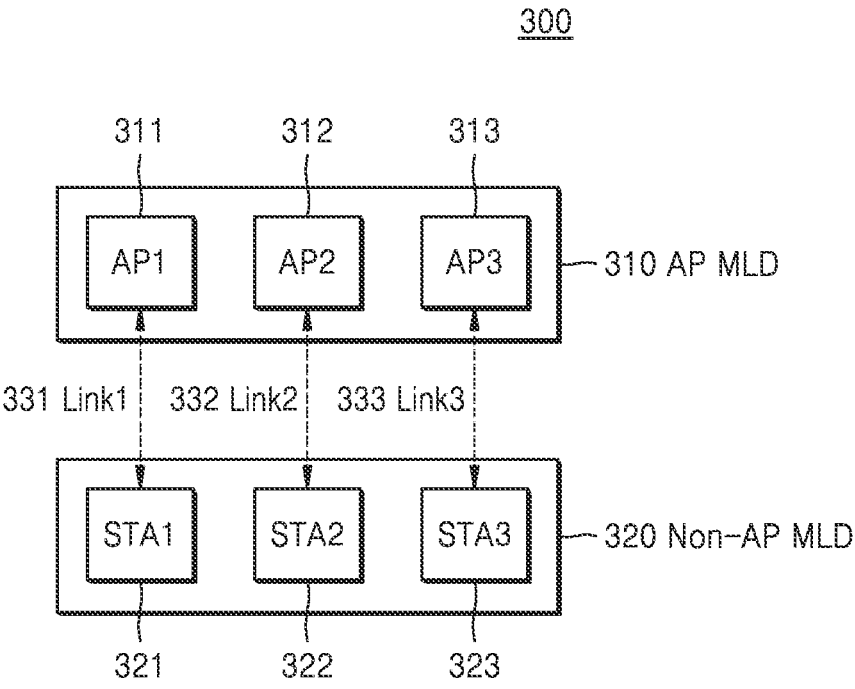
FIG. 3 illustrates a multi-link communication system according to an embodiment.

FIG. 3 illustrates a multi-link communication system 300 according to an embodiment.

The multi-link communication system 300 may include one or more multi-link devices. The multi-link communication system 300 may be compatible with a multi-link protocol of IEEE 802.11be.

In detail, the multi-link communication system 300 may include an AP MLD 310 and a non-AP MLD 320. The AP MLD 310 may include one or more APs (for example, AP1, AP2, and AP3) 311 to 313. The non-AP MLD 320 may include one or more STAs (for example, STA1, STA2, and STA3) 321 to 323. The AP MLD 310 may set up the non-AP MLD 320 and a multi-link. For example, the AP MLD 310 may set up the non-AP MLD 320, a link 1 331, a link 2 332 and a link 3 333. In detail, the AP1 311 of the AP MLD 310 may transmit or receive data to or from the STA1 321 of the non-AP MLD 320 through the link 1 331 based on a frequency band of 2.4 GHz. The AP2 312 of the AP MLD 310 may transmit or receive data to or from the STA2 322 of the non-AP MLD 320 through the link 2 332 based on a frequency band of 5 GHz. The AP3 313 of the AP MLD 310 may transmit or receive data to or from the STA3 323 of the non-AP MLD 320 through the link 3 333 based on a frequency band of 6 GHz.

As described above, the AP MLD 310 and the non-AP MLD 320 may transmit or receive data therebetween through a multi-link. Such an operation may be referred to as an MLO. The number of APs included in the AP MLD 310 and the number of STAs included in the non-AP MLD 320 are not limited to those described above and may be variously set. Also, frequency bands of the link 1 331, the link 2 332, and the link 3 333 are not limited to those described above and a combination of the frequency bands of the link 1 331, the link 2 332, and the link 3 333 may be variously implemented.

Figure 4:
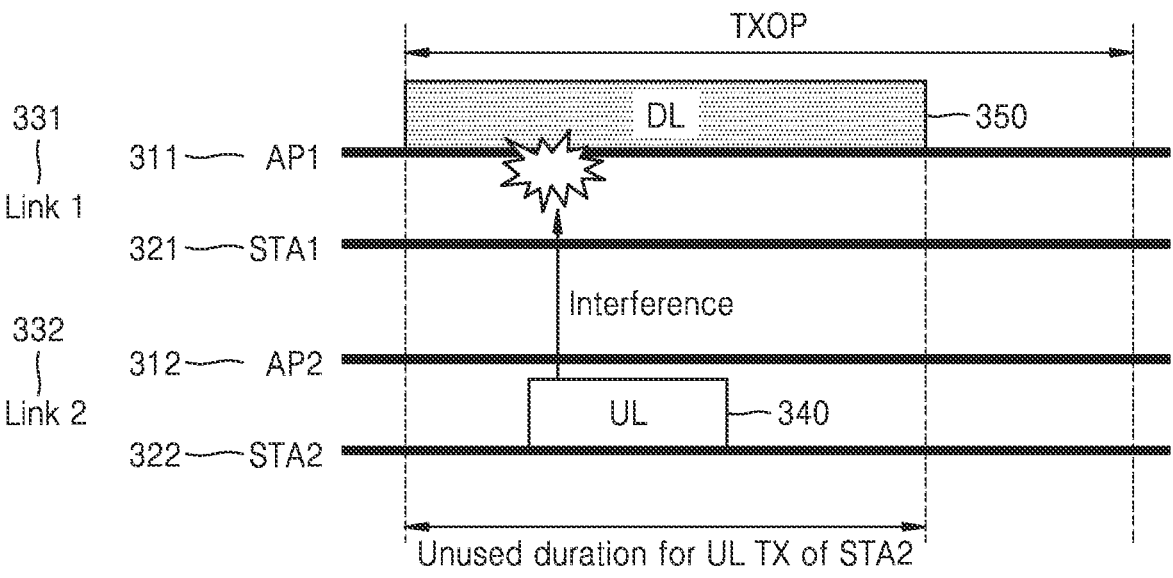
FIG. 4 illustrates an example of a non-simultaneous transmit and receive (NSTR) link pair according to an embodiment; embodiment.

FIG. 4 illustrates an example of a NSTR link pair. FIG. 4 will be described below with reference to FIG. 3.

The AP1 of the AP MLD 310 may communicate with the STA1 321 of the non-AP MLD 320 through the link 1 331. The AP2 of the AP MLD 310 may communicate with the STA2 322 of the non-AP MLD 320 through the link 2 332. Channel access in each of the links 1 and 2 331 and 332 may be independent, except for a certain case. In this regard, transmission/reception in the link 1 331 and transmission/reception in the link 2 332 may not be affected by each other. When the links 1 and 2 331 and 332 are not sufficiently separated from each other in a frequency domain or power leakage occurs in the non-AP MLD 320, interference between the links 1 and 2 331 and 332 may occur. Referring to FIG. 4, an uplink 340 of the link 2 332 of the STA2 322 may affect a downlink 350 in the link 1 331 of the AP1 331. Such a link pair may be referred to as an NSTR link pair.

When the non-AP MLD 320 transmits a signal in one link of the NSTR link pair, signal reception and CCA may not be performed in one other link of the NSTR link pair. Therefore, even in a case where the non-AP MLD 320 capable of performing an MLO uses multi-links 331 and 332, when the non-AP MLD 320 transmits or receives a signal to or from the AP MLD 310, based on the NSTR link pair, the non-AP MLD 320 may not sufficiently have a gain for using a multi-link.

Figure 5:
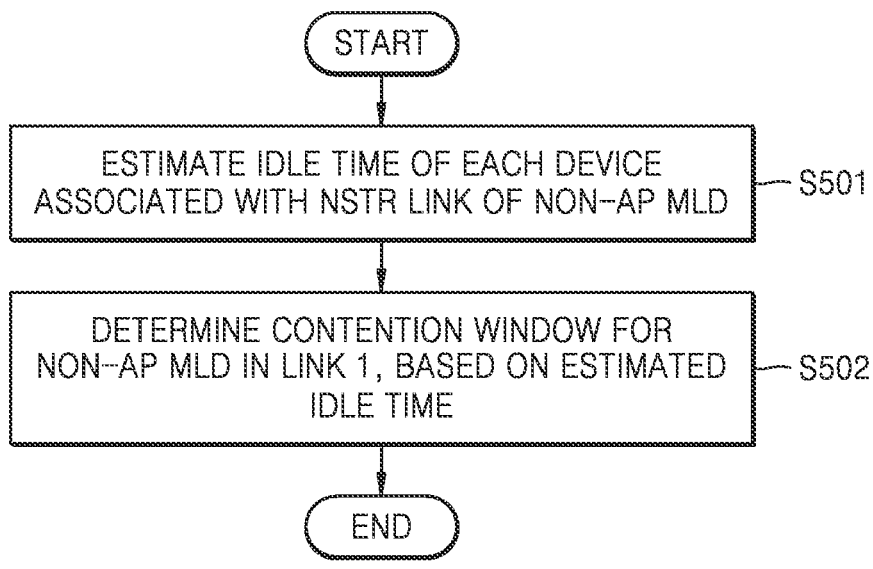

FIG. 5 illustrates a contention window determination process according to an embodiment. FIG. 5 will be described with reference to FIGS. 3 and 4.

For convenience of description, it may be assumed that the link 1 331 and the link 2 332 are an NSTR link pair, and the following description will be given with regard to the link 1 331. Referring to FIG. 5, in operation S501, the AP MLD 310 may estimate an idle time of each device associated with an NSTR link of the non-AP MLD 320. In detail, the AP MLD 310 may estimate an idle time of an SLD and the non-AP MLD 320 associated with the link 1 331 of the non-AP MLD 320. The SLD may denote a device which transmits or receives a frame to or from an AP, based on one link.

For example, the AP MLD 310 may estimate channel utilization in the link 1 331. The channel utilization may be expressed as in the following Equation 1.

$$\text{Channel Utilization} = \qquad\qquad\qquad [\text{Equation 1}]$$
$$\left\lfloor \frac{\text{channel busy time}}{dot11ChannelUtilizationBeaconIntervals \times} \times 255 \atop dot11BeaconPeriod \times 1024 \right\rfloor$$

Also, the AP MLD 310 may estimate a channel use time of the non-AP MLD 320 in the link 1 331. Therefore, the AP MLD 310 may estimate an idle time of the non-AP MLD 320. An idle time of the non-AP MLD 320 in the link 1 331 may be expressed as in the following Equation 2.

Non-AP MLD's idle time=1−(channel utilization−
  Non-AP MLD's Tx time at other link)    [Equation 2]

Referring to Equation 2, the idle time of the non-AP MLD 320 in the link 1 331 may be estimated based on channel utilization, except transmission, of the idle time of the non-AP MLD 320 in the link 2 332.

An idle time of the SLD in the link 1 may be the same as the idle time of the AP MLD 310. The idle time of the SLD may be expressed as in the following Equation 3.

SLD's idle time=1−channel utilization    [Equation 3]

Referring to Equation 3, the idle time of the AP MLD 310 may be the same as an idle time of the SLD, and thus, the AP MLD 310 may estimate the idle time of the SLD, based on the idle time thereof As described above, the AP MLD 310 may estimate each of the idle time of the SLD and the idle time of the AP MLD 310 each associated with the link 1 331.

In operation S502, the AP MLD 310 may determine a contention window for the non-AP MLD 320 in the link 1 331, based on the estimated idle time. In detail, the AP MLD 310 may determine the contention window of the non-AP MLD 320 in the link 1 331, based on the idle time of the SLD and the idle time of the AP MLD 310. The determined contention window may be expressed as in the following Equation 4.

$$W^* = \text{ceil} \qquad \text{[Equation 4]}$$

$$\left( \frac{Non-AP\ MLD\text{'s idle time}}{SLD\text{'s idle time}} \times \text{Default contention window} \right)$$

Referring to FIG. 4, W may denote the determined contention window. Also, W may be obtained through chain modeling.

The idle time of the SLD may be greater than the idle time of the non-AP MLD 320. Therefore, a determined contention window value may be less than a default contention window value, and a back-off counter value may be reduced. As the number of idle slots, which the STA1 321 of the non-AP MLD 320 has to wait for, for channel access is reduced, the STA1 321 of the non-AP MLD 320 may attempt channel access in the link 1 331 which is an NSTR link, based on a probability similar to the SLD. Also, the STA1 321 of the non-AP MLD 320 may have a throughput similar to the SLD in the link 1 331.

In the contention window determination process, for convenience of description, a case where one non-AP MLD 320 and one SLD operate has been described for example, but embodiments are not limited thereto and the contention window determination process may be applied to a case where a plurality of non-AP MLDs and SLDs operate.

Figure 6A:
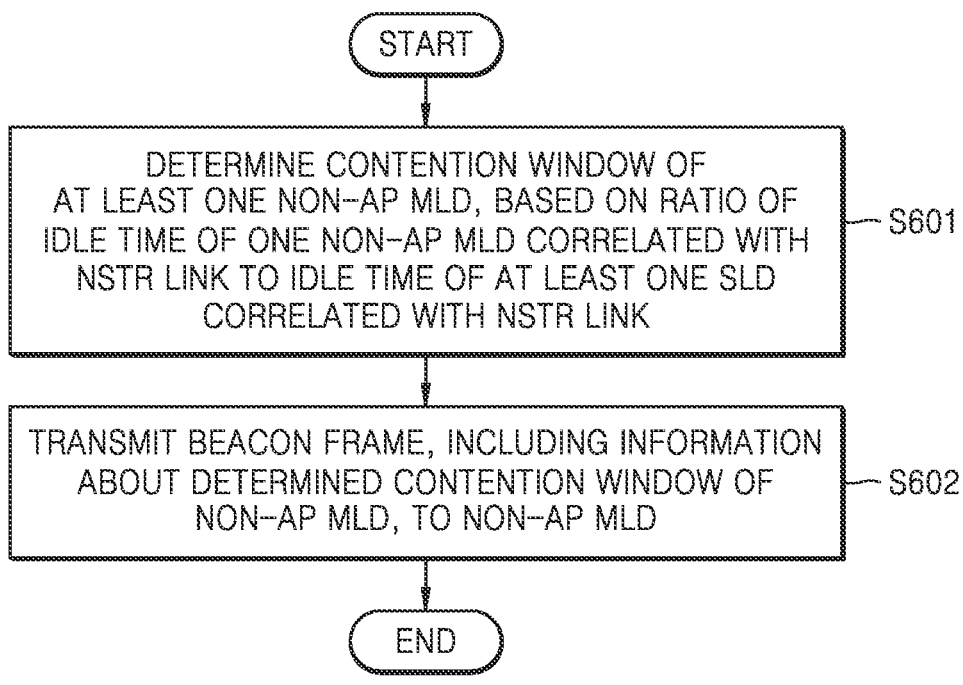
FIG. 6A illustrates an operating method of an access point multi-link device (AP MLD), according to an embodiment.

FIG. 6A illustrates an operating method of an access point multi-link device (AP MLD), according to an embodiment. FIG. 6B illustrates an example of an EDCA parameter set element format. FIG. 6A will be described with reference to FIG. 3.

In operation S601, the AP MLD 310 may determine a contention window of the non-AP MLD 320, based on a ratio of an idle time of the non-AP MLD 320 correlated with the NSTR link to an idle time of at least one SLD correlated with the NSTR link.

For example, the AP MLD 310 may estimate channel utilization in the NSTR link. The AP MLD 310 may estimate a channel use time of the non-AP MLD 320. The AP MLD 310 may estimate an idle time of the non-AP MLD 320, based on the channel utilization and the channel use time. The AP MLD 310 may estimate an idle time of the at least one SLD, based on an idle time of the AP MLD 310.

The idle time of the non-AP MLD 320 may be less than the idle time of the at least one SLD. Accordingly, the contention window of the non-AP MLD 320 determined by the AP MLD 310 may be less than a default contention window. Also, the non-AP MLD 320 correlated with the NSTR link may attempt channel access, based on a back-off counter value which is less than at least one SLD correlated with the NSTR link.

In operation S602, the AP MLD 310 may transmit a beacon frame, including information about the determined contention window of the non-AP MLD 320, to the non-AP MLD 320. The information about the determined contention window of the non-AP MLD 320 may be included in an EDCA parameter set of the beacon frame. The AP MLD 310 may vary an EDCA parameter of the non-AP MLD 320 through an EDCA parameter set element in transmitting the beacon frame.

Referring to FIG. 6B, the EDCA parameter set may include a QoS Info field and an Update EDCA Info field. The AP MLD 310 may broadcast a beacon frame to the at least one SLD, and the QoS Info field may include information about a contention window of the at least one SLD. The QoS Info field may include an EDCA Parameter Set Update Counter subfield. The non-AP MLD 320 may determine whether to update the EDCA parameter, based on the EDCA Parameter Set Update Counter subfield. The Update EDCA Info field may be a field for an S1G (Sub 1 GHz) STA and may be reserved bits in association with a non-S1G STA.

The AP MLD 310 may set an EDCA parameter of the non-AP MLD 320, based on the QoS Info field and the Update EDCA Info field. Whether to update the EDCA parameter of the non-AP MLD 320 may be determined based on the Update EDCA Info field. The Update EDCA Info field may include the information about the determined contention window of the non-AP MLD 320. For example, the AP MLD 310 may use 4 bits, which are before the Update EDCA Info field, as the EDCA Parameter Set Update Counter subfield for the non-AP MLD 320. Also, when a relevant non-AP MLD is provided in plurality, the AP MLD 310 may selectively update the plurality of non-AP MLDs by using the other reserved bits. Also, the AP MLD 310 may set the EDCA Parameter Set Update Counter subfield to 0, so as to prevent a change in EDCA parameters of SLDs.

The beacon frame may further include a BSS load element including channel utilization information.

Figure 7A:
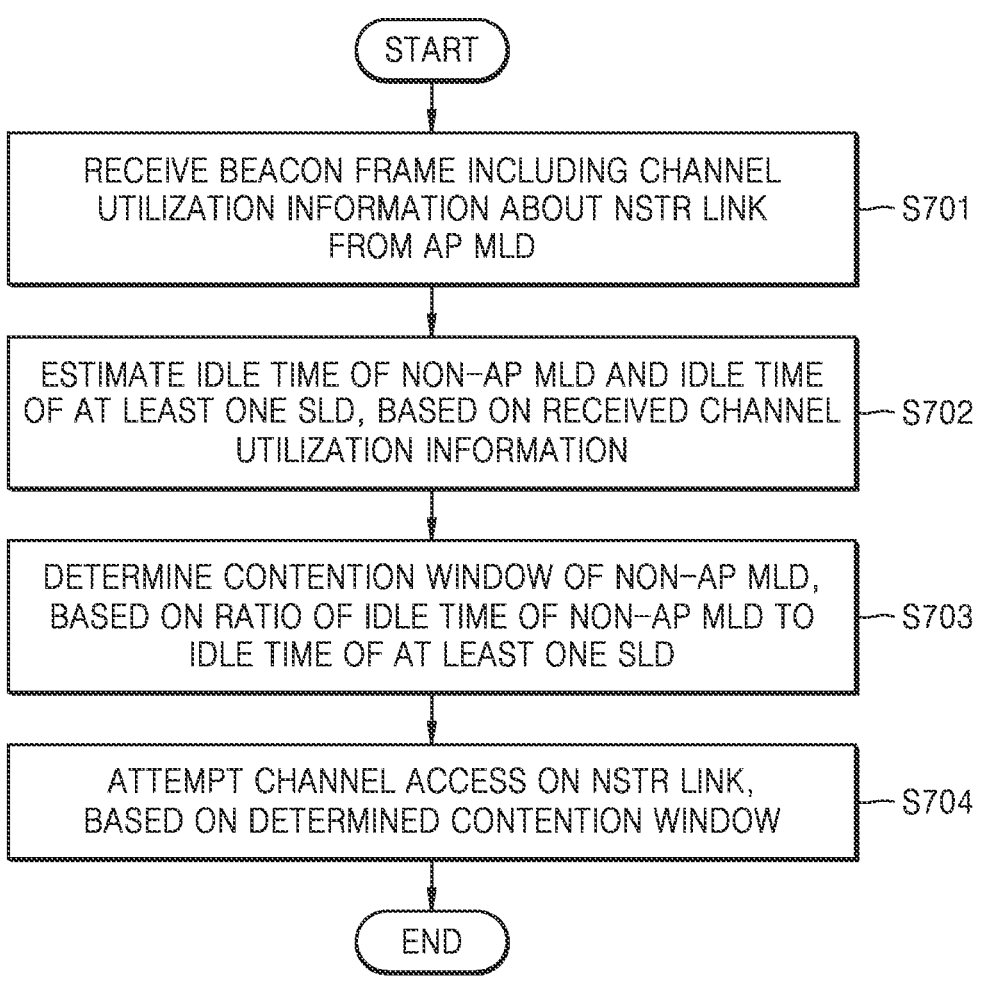
FIG. 7A illustrates an operating method of a non-AP MLD, according to an embodiment.
Figure 7B:
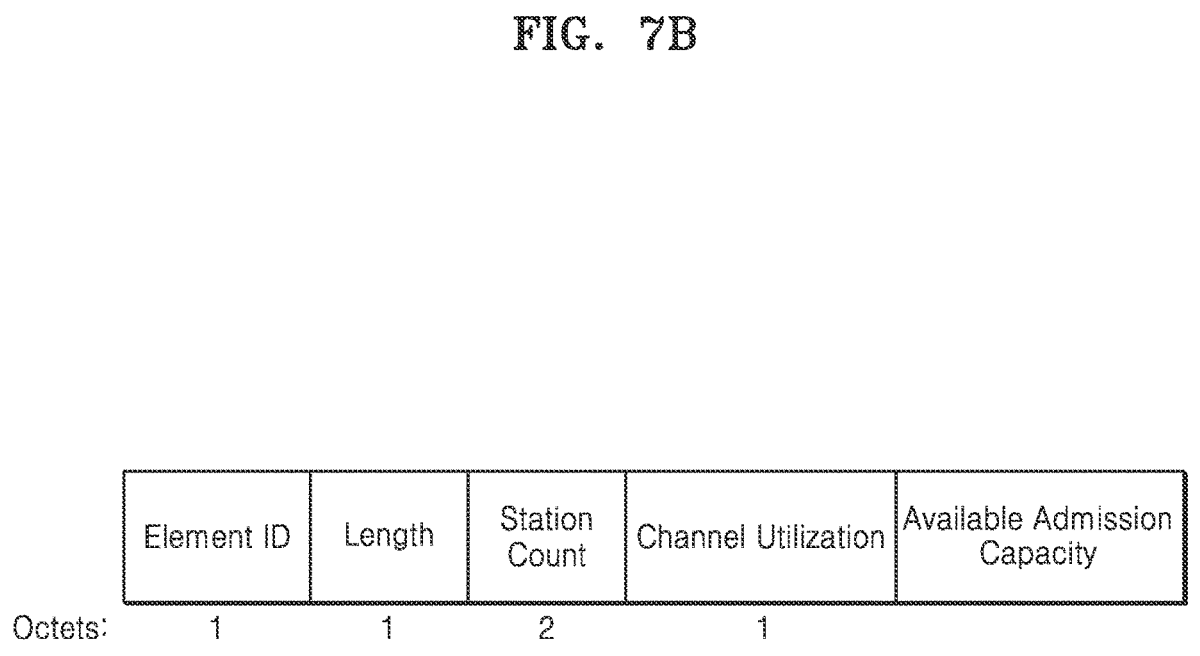

FIG. 7A illustrates an operating method of a non-AP MLD, according to an embodiment. FIG. 7B illustrates an example of a BSS load element. FIG. 7A will be described with reference to FIG. 3.

For convenience of description, it may be assumed that the link 1 331 and the link 2 332 are an NSTR link pair, and the following description will be given with regard to the link 1 331.

Referring to FIG. 7A, in operation S701, the non-AP MLD 320 may receive a beacon frame, including channel utilization information about an NSTR link, from the AP MLD 310. Referring to FIG. 7B, the beacon frame may include a BSS load element. The BSS load element may include the channel utilization information. For example, the STA1 321 of the non-AP MLD 320 may receive a beacon frame, including channel utilization information about the link 1 331, from the AP1 311 of the AP MLD 310.

In operation S702, the non-AP MLD 320 may estimate an idle time of the non-AP MLD 320 and an idle time of at least one SLD, based on the received channel utilization information. The idle time of the non-AP MLD 320 may be less than the idle time of the at least one SLD. The non-AP MLD 320 may estimate the idle time of the non-AP MLD 320 and the idle time of at least one SLD, based on Equations 1 to 3 described above. In this regard, the non-AP MLD 320 may receive a parameter including the channel utilization information from the AP MLD 310 and may calculate the idle time of the non-AP MLD 320 and an idle time of an SLD STA for determining a contention window of the non-AP MLD 320, based on the received parameter.

For example, the STA1 321 of the non-AP MLD 320 may receive the channel utilization information about the link 1 331 from the AP1 311 of the AP MLD 310 and may calculate an idle time of the STA1 321 and an idle time of each SLD correlated with the link 1 331 by using the received channel utilization information.

In operation S703, the non-AP MLD 320 may determine a contention window of the non-AP MLD 320, based on a ratio of an idle time of the non-AP MLD 320 to an idle time of the at least one SLD. The non-AP MLD 320 may determine a contention window of the non-AP MLD 320 in an NSTR link, based on Equation 4 described above. In this regard, the non-AP MLD 320 may receive the channel utilization information from the AP MLD 310 to directly measure an idle time of the non-AP MLD 320 and may determine the contention window thereof For example, the STA1 321 may determine a contention window thereof corresponding to the link 1 331, based on an idle time of the STA1 321 and an idle time of each of SLD STAs correlated with the link 1 331.

In operation S704, the non-AP MLD 320 may attempt channel access on the NSTR link, based on the determined contention window.

For example, the STA1 321 may attempt channel access in the link 1 331, based on the contention window determined by the STA1 321. Accordingly, the STA1 321 may perform channel access like the SLD STAs correlated with the link 1 331.

Figure 8:
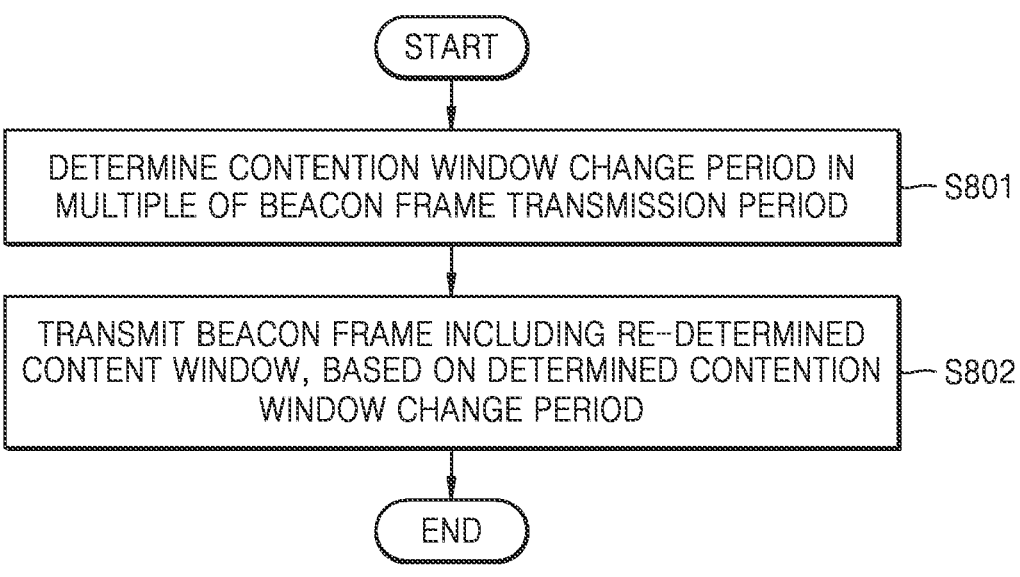
FIG. 8 illustrates an operating method of an AP MLD, according to an embodiment.

FIG. 8 illustrates an operating method of an AP MLD, according to an embodiment. FIG. 8 will be described below with reference to FIG. 3.

Referring to FIG. 8, in operation S801, the AP MLD 310 may determine a contention window change period in a multiple of a beacon frame transmission period. For example, the AP MLD 310 may re-determine a contention window of the non-AP MLD 320, based on a period of one of a multiple of the beacon frame transmission period.

In operation S802, the AP MLD 310 may transmit a beacon frame including the re-determined contention window, based on the determined contention window change period. In this regard, the AP MLD 310 may transmit a beacon frame including a changed contention window in one of slots corresponding to a period of the beacon frame.

Figure 9A:
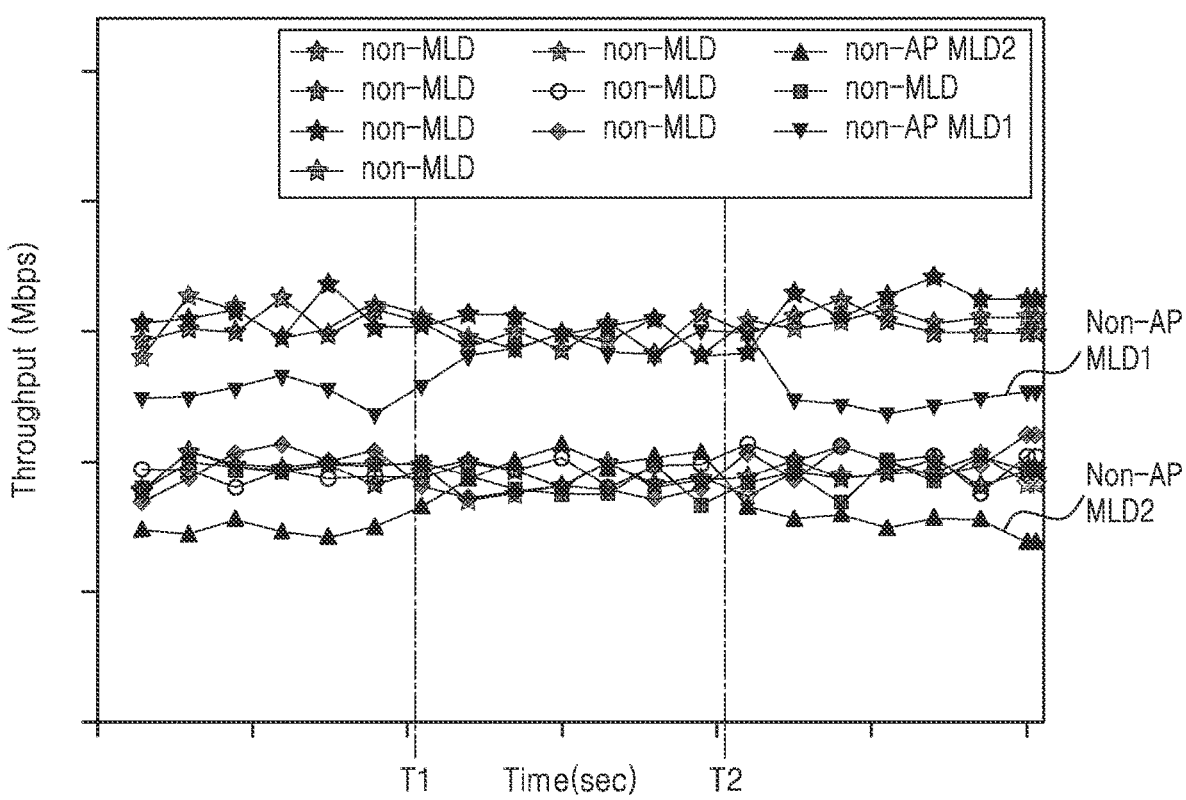
FIG. 9A illustrates throughput of a non-AP MLD according to an embodiment.
Figure 9B:
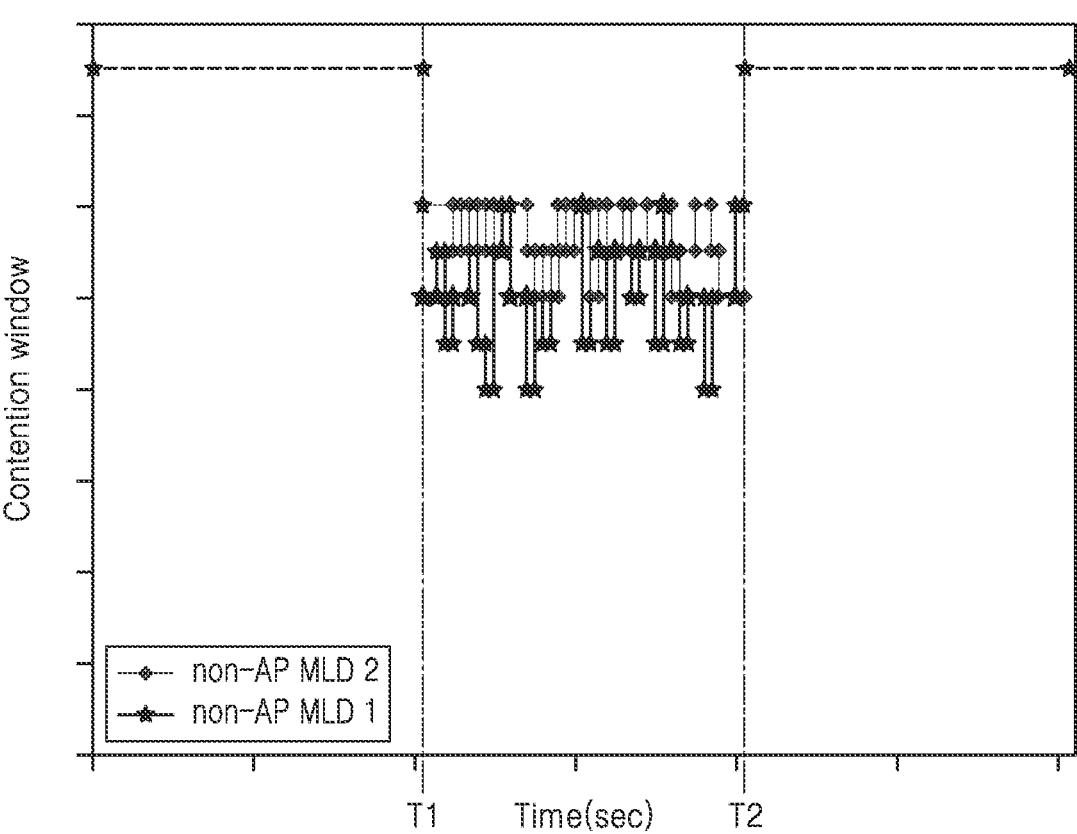
FIG. 9B illustrates a variation of a contention window value of a non-AP MLD according to an embodiment.

FIG. 9A illustrates throughput of a non-AP MLD according to an embodiment. FIG. 9B illustrates a variation of a contention window value of a non-AP MLD according to an embodiment.

Referring to FIGS. 9A and 9B, a non-AP MLD1 and a non-AP MLD2 may operate from T1 to T2 by using a changed contention window CW in FIGS. 5 to 8 and may operate again from T2 by using a default contention window. Referring to FIG. 9B, a contention window CW from T1 to T2 in a non-AP MLD1 and a non-AP MLD2 may be less than a contention window at a different time.

Referring to FIG. 9A, throughput of each of the non-AP MLD1 and the non-AP MLD2 may increase between T1 and T2. Also, it may be seen that the throughput of each of the non-AP MLD1 and the non-AP MLD2 is similar to throughput of a non-MLD (i.e., an SLD) between T1 and T2.

The above-described embodiments are for describing the inventive concept, and the scope of the present disclosure is not limited by the specific aspects of embodiments described herein.

While aspects of embodiments have been particularly shown and described, it will be understood that various changes in form and details may be made therein without departing from the spirit and scope of the following claims.

What is claimed is:

1. An operating method of an access point (AP) multi-link device (MLD), the operating method comprising:
    based on at least one non-AP MLD and at least one single link device (SLD) attempting channel access through a first link of the AP MLD, identifying a contention window of the at least one non-AP MLD, based on a ratio of, with respect to the first link, an idle time of the at least one non-AP MLD to an idle time of the at least one SLD; and
    transmitting a beacon frame comprising information about the contention window to the at least one non-AP MLD.

2. The operating method of claim 1, wherein the identifying the contention window comprises:
    quantifying channel utilization of the first link;
    quantifying a channel use time of the at least one non-AP MLD; and
    estimating the idle time of the at least one non-AP MLD, based on the channel utilization and the channel use time.

3. The operating method of claim 2, wherein the identifying the contention window comprises estimating an idle time of the at least one SLD, based on an idle time of the AP MLD.

4. The operating method of claim 1, wherein the idle time of the at least one non-AP MLD is less than the idle time of the at least one SLD, and
    wherein the first link comprises a non-simultaneous transmit and receive (NSTR) link.

5. The operating method of claim 1, further comprising identifying an updated contention window of the at least one non-AP MLD, based on a period of one of a multiple of a transmission period of the beacon frame.

6. The operating method of claim 1, wherein the information about the contention window is indicated by an enhanced distribution channel access (EDCA) parameter set of the beacon frame, and
    wherein the EDCA parameter set comprises a quality of service (QoS) Info field and an Update EDCA Info field.

7. The operating method of claim 6, further comprising transmitting the beacon frame to the at least one SLD,
    wherein the QoS Info field comprises information about a second contention window of the at least one SLD.

8. The operating method of claim 7, wherein the QoS Info field comprises an EDCA Parameter Set Update Counter subfield indicating 0.

9. The operating method of claim 6, further comprising identifying whether to update an EDCA parameter of the at least one non-AP MLD, based on the Update EDCA Info field,
    wherein the Update EDCA Info field comprises the information about the contention window.

10. The operating method of claim 1, wherein the beacon frame further comprises a basic service set (BSS) load element indicating channel utilization information.

11. An access point (AP) multi-link device (MLD) comprising:
    a transceiver; and
    a processor configured to:
        based on at least one non-AP MLD and at least one single link device (SLD) attempting channel access through a first link of the AP MLD, identify a contention window of the at least one non-AP MLD, based on a ratio of, with respect to the first link, an idle time of the at least one non-AP MLD to an idle time of the at least one SLD; and
        control the transceiver to transmit a beacon frame comprising information about the contention window to the at least one non-AP MLD.

12. The AP MLD of claim 11, wherein the processor is configured to:
    quantify channel utilization of the first link,
    quantify a channel use time of the at least one non-AP MLD, and
    estimate the idle time of the at least one non-AP MLD, based on the channel utilization and the channel use time.

13. The AP MLD of claim 11, wherein the processor is further configured to estimate the idle time of the at least one SLD, based on an idle time of the AP MLD.

14. The AP MLD of claim 11, wherein the idle time of the at least one non-AP MLD is less than the idle time of the at least one SLD, and wherein the first link comprises a non-simultaneous transmit and receive (NSTR) link.

15. The AP MLD of claim 11, wherein the processor is configured to identify an updated contention window of the at least one non-AP MLD, based on a period of one of a multiple of a transmission period of the beacon frame.

16. The AP MLD of claim 11, wherein the processor is configured to control the transceiver to transmit the beacon frame to the at least one SLD, wherein the information about the contention window is indicated by an enhanced distribution channel access (EDCA) parameter set of the beacon frame, wherein the EDCA parameter set comprises a quality of service (QoS) Info field and an Update EDCA Info field, wherein the QoS Info field comprises information about a second contention window of the at least one SLD and an EDCA Parameter Set Update Counter subfield, and the EDCA Parameter Set Update Counter subfield is 0, wherein whether to update an EDCA parameter of the at least one non-AP MLD is identified based on the Update EDCA Info field, and wherein the Update EDCA Info field comprises the information about the contention window.

\* \* \* \* \*